April 18, 1967　　　R. W. EVANS　　　3,314,298
VARIABLE RATE FEEDERS
Original Filed Aug. 10, 1961
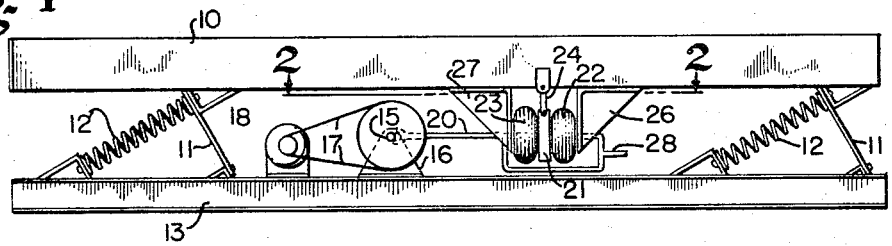
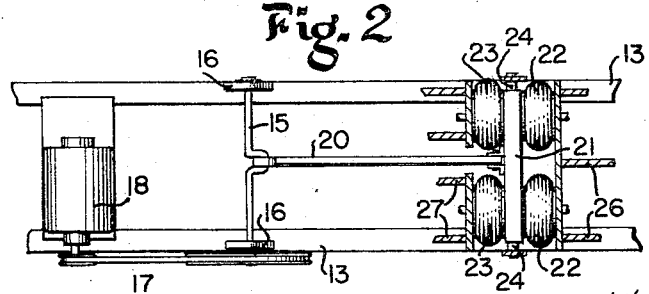
INVENTOR.
ROBLEY W. EVANS
BY *Marshall, Wilson + Click*
ATTORNEYS

3,314,298
VARIABLE RATE FEEDERS
Robley W. Evans, New Albany, Ind., assignor to Rex Chainbelt Inc., a corporation of Wisconsin
Continuation of application Ser. No. 130,637, Aug. 10, 1961. This application Aug. 19, 1965, Ser. No. 486,253
6 Claims. (Cl. 74—26)

This is a continuation of application Ser. No. 130,637, filed Aug. 10, 1961.

This invention relates to the drive means for vibratory conveyors and in particular to an adjustable drive means for a tuned vibratory conveyor that permits the amplitude of vibration of the conveyor to be easily controlled over a wide range of amplitudes.

Many vibratory conveyors, feeders, and vibratory screens have been constructed employing a crank and connecting rod drive to produce the vibration of the work member. In this type of apparatus the amplitude of vibration is fixed by the throw of the crank or eccentric and thus cannot be easily altered while the machine is in operation. Adjustable eccentrics have been used to vary the stroke of a vibratory member but these adjustable eccentrics either require very complex adjusting mechanism or require that the apparatus be stopped in order that the adjustment may be effected.

The principal object of this invention is to provide an adjustable drive mechanism for a vibratory conveyor that permits the amplitude of vibration to be adjusted without change of speed and without requiring stopping of the conveyor.

Another object of the invention is to provide an adjustable resilient connection in the drive between a crank or eccentric shaft and a vibratory conveyor to regulate the amount of force applied to the conveyor.

A still further object of the invention is to provide an amplitude control for a crank and connecting rod driven vibratory apparatus in which air springs are employed to vary the amplitude of vibration.

Another object of the invention is to provide the proper tuning for a vibratory conveyor so that adjustment of the spring rate of resilient elements included in the connecting rod drive may produce usable variations in amplitude of vibration of the work member.

More specific objects and advantages are apparent from the following description of preferred forms of the invention.

According to the invention an adjustable spring, the spring rate of which may be varied while the spring is in operation, is included in the drive between a connecting rod and a resiliently supported vibratory work member which work member is tuned in such a manner that its natural or resonant frequency is near but not equal to the operating speed of the crank or eccentric shaft. Preferably the work member is tuned so that its resonant frequency is higher than the operating speed so that upon adjustment of the variable rate drive spring the amplitude of vibration varies from a small amplitude to an amplitude approximating but not exceeding the stroke of the eccentric or crank. The invention also includes tuning the vibratory work member so that its resonant frequency is below the operating speed so that vibratory amplitudes in excess of the stroke of the crank or eccentric may be obtained.

Preferred embodiments of the invention are illustrated in the accompanying drawings.

In the drawings:

FIG. 1 is a side elevation of a vibratory conveyor or feeder constructed according to the invention.

FIG. 2 is a horizontal section taken substantially along the line 2—2 of FIG. 1.

FIG. 3 is a graph illustrating the tuning characteristics of the conveyor shown in FIG. 1.

FIG. 4 is a graph showing the relationship between the spring rate of the air springs and the inflation pressure of the springs.

FIG. 5 is a schematic diagram representing the system shown in FIG. 1 for one condition of tuning.

FIG. 6 is a schematic diagram representing the system shown in FIG. 1 for another condition of tuning.

FIG. 7 is a side elevation of a vibratory conveyor or feeder showing a different arrangement of the drive mechanism.

FIG. 8 is a fragmentary side elevation of still another form of drive for a vibratory feeder or conveyor.

These specific figures and the accompanying description are intended merely to illustrate the invention and not to impose limitations on its scope.

In a vibratory apparatus according to the invention, a work member in the form of a conveyor trough 10 is supported on resilient means comprising cantilever springs 11 and coil springs 12. In many light duty conveyors or feeders the cantilever springs 11 may constitute the entire resilient support for the work member 10. Other resilient means may be employed such as properly oriented rubber blocks stressed in compression or shear or properly oriented pneumatic springs. The resilient means comprising the cantilever springs 11 and coil springs 12 are mounted on a base 13 which may either be rigidly attached to a foundation or, if heavy enough, be resiliently supported on vibration isolating springs so as to minimize the transmission of objectionable vibratory force to the foundation or building in which the structure is operated.

Vibratory motion of the conveyor deck 10 with respect to the base 13 is produced by forces from a crankshaft 15 that is journaled in bearing blocks 16 erected from the base 13. The crankshaft 15 is connected through belt 17 to a drive motor 18 also mounted on the base 13. A connecting rod 20 connected to the crankshaft 15 includes a rigidly connected crosshead 21 that is sandwiched between pairs of air springs 22 and 23. Since the air springs, when deflated, are laterally unstable, the crosshead 21 is guided by links or cantilever springs 24 connected to the conveyor trough 10. The links 24 may, alternatively, be connected to the base 13. The air springs 22 and 23 are mounted between brackets 26 and 27 depending from the conveyor trough 10.

For the purpose of controlling the amplitude of vibration the inflation pressure of the air springs 22 and 23 is varied by varying the pressure in a connecting line 28 leading to the various air springs. Preferably the line 28 has a very small diameter to minimize the circulation of air from one air spring to another as the springs are subjected to the vibratory force. A suitable pressure control for controlling the inflation pressure of the air springs may comprise an adjustable self-bleeding pressure regulator connected to a supply of air under pressure with the regulator connected to the supply line 28 leading to the various air springs.

The vibratory work member represented by the conveyor trough 10 cooperates with the resilient means comprising the cantilever springs 11 and the coil springs 12, if used, to form a vibratory system that has a resonant frequency. In such a tuned system, when operated at frequencies below such resonant frequency, the spring force exceeds the inertia forces and the system resists deflection or deformation from a static rest position. When vibratory force is applied at frequencies above the resonant frequency the inertia forces exceed the spring force and the system resists changes in acceleration of the work member 10, the system thus appearing as a mass, the magnitude of which varies according to the actual speed of operation. At the resonant speed or frequency the inertia force equals the spring force and the system may be maintained in vibration with a very small force.

FIG. 3 is a diagram illustrating the magnitude of the apparent mass or spring effect of the conveyor member 10 plotted against operating frequency. Thus when the frequency is near zero the system responds as if it were a spring having a magnitude corresponding to the distance from the origin to a point 30. This, at zero frequency, is the actual spring rate of the resilient supporting means 11 and 12. As the frequency of operation is increased the apparent spring rate decreases until it becomes zero at point 31 representing the resonant frequency of operation. At higher frequencies the system appears as a mass the magnitude of which increases with an increase in frequency. Thus, the force required to maintain the system in vibration varies, according to the tuning, from a large force in phase with the deflection of the springs at very low frequencies through zero to a large force out of phase with the deflection at higher frequencies.

The effective spring rate of the pairs of air springs 22 and 23 varies directly as the inflation pressure as indicated by the curve in FIG. 4. This curve neglects the constant effect of the stiffness of the side walls of the air springs which provides a constant spring rate in addition to the variable component. In practice the spring rate may be assumed to vary as a linear function of the air pressure. According to the invention, the feeder or conveyor system is preferably operated at a frequency represented by an ordinate 32 in FIG. 3 which indicates an operating frequency below the resonant frequency so that the system simulates a spring having a spring rate less than the rate of the resilient elements. The corresponding system is illustrated diagrammatically in FIG. 5 as comprising a crank or eccentric drive 33 that is connected through an adjustable spring 34 to an equivalent spring 35 representing the effective spring rate at the selected tuning of the vibratory system. When the adjustable spring 34 representing the air springs 22 and 23 is adjusted for a low rate, by being inflated to a low air pressure, the movement of the conveyor 10, represented by an intermediate point 36 in the diagram, will be a minimum. The actual motion can be computed from the effective spring rates.

As the air spring inflation pressure is increased the spring rate of the adjustable spring 34 increases so that when the air springs exhibit a spring rate corresponding to the effective spring rate of the work member system the amplitude of vibration of the conveyor deck 10, represented by the point 36, will then be half of the amplitude or stroke of the crank mechanism 33. Further increases in inflation pressure, by further increase of rate of the adjustable spring 34, results in greater amplitude of movement of the intermediate point 36 approaching but not reaching the stroke of the crank.

This is the desired mode of operation and differs from the systems suggested in Patents Nos. 1,720,574 and 1,722,167 issued to G. H. Schieferstein in July of 1929. In these patents the vibratory system corresponding to the work member and its resilient means is suggested as being tuned exactly to resonance and a spring connected connecting rod is then used to drive the system. This cannot accomplish an amplitude control that is stable for use because the system operates at what would correspond to the point 31 of FIG. 3 so that regardless of the adjustment of the air springs, representing the resilient connecting means, the amplitude of vibration is still substantially equal to the throw of the crank or eccentric. According to the invention, by detuning the system so that the operating speed is removed from the resonant frequency, the driven system exhibits a more or less fixed spring rate representing a certain amount of resisting force that is sufficient to reduce the vibration when the driving force is small. Since these are spring forces they result in stresses in the connecting rod and load on the shaft bearings but do not absorb appreciable power because the force and velocities are not in phase.

While it is preferable to drive the vibratory system below its resonant frequency, it may also be driven at frequencies above the resonant frequency. As indicated by the ordinate 38 of FIG. 3 the vibratory system then appears as a mass. The corresponding system is represented in FIG. 6 to include an equivalent mass 40 and an adjustable connecting spring 41 driven by a crank mechanism 42. In this tuning arrangement with the air springs deflated the amplitude of vibration of the work member 10, represented by the vibration of the equivalent mass 40, is now quite small being limited entirely by the residual or effective inertia of the tuned system. As the adjustable spring 41 is increased in rate the amplitude of vibration of the equivalent mass, the work member, continually increases. When the equivalent mass becomes resonant with the adjustable spring the amplitude of vibration may become large, in fact, many times the stroke of the crank mechanism 42. This is an undesirable mode of operation because of the bearing loads. Then as the air spring is inflated still further to increase its rate the amplitude of vibration of the work member decreases from the maximum and approaches an amplitude equal to the stroke of the crankshaft. For satisfactory operation of this system the air springs must be kept at a spring rate to operate below the resonant condition.

When the system is operated above its resonant frequency, as just described, it tends to vary its amplitude, for a given adjustment of the spring rate, with changes in load whereas when the system is operated below its resonant frequency as first described, according to the diagram of FIG. 5, the amplitude does not vary appreciably with changes in load.

FIGS. 7 and 8 illustrate modified versions of the improved drive and in particular provide structure in which the driving force can be reduced practically to zero whereas in the apparatus shown in FIG. 1 the driving force cannot be reduced below that represented by the minimum spring rate of the adjustable springs. In the system shown in FIG. 7 a vibratory work member 50 is carried on resilient means comprising cantilever springs 51 and coil springs 52 erected from a base 53. In this arrangement a crankshaft 55 is carried on bearings 56 connected to the work member 50. The crankshaft 55 is driven through a belt 57 from a motor 58 mounted on the base 53. A connecting rod 60 connected to the crankshaft 55 carries an integral crosshead 61 that is sandwiched between pairs of air springs 62 and 63. Also to provide stability the crosshead 61 is guided by links 64. The air springs are held between brackets 66 and 67 erected from the base 53 and are inflated with air under controlled pressure from an air line 68. While the only structural difference between this arrangement and that shown in FIG. 1 is the interchange of the crankshaft and air springs from the base to the work member 10, this arrangement provides the additional feature that when the spring rate of the combination of air springs 62 and 63 is properly adjusted with respect to the mass of the crosshead 61 and connecting rod 60 a resonant condition is set up so that practically no force at all is required from the crankshaft 55 to drive the connecting rod 60 and crosshead 61 through its full stroke of vibration corresponding to the throw of the crankshaft. When this happens there is no force transmitted through the connecting rod 60 and therefore no force applied to the work member 50 even though the crankshaft is being rotated at operating speed. This represents the condition of minimum amplitude of vibration of the work member system regardless of whether the work member system is tuned to have its resonant frequency above or below the operating speed. Except for this one difference the system shown in FIG. 7 operates the same as that shown in FIG. 1.

FIG. 8 shows a construction to achieve all the features of FIG. 7 and eliminate the disadvantage of vibratory motion of the pulley on the crankshaft 55 which causes flopping or whipping of the belt 57. In this arrangement a work member 70 carried on cantilever guide springs 71 and coil springs 72 erected from a base 73 is driven by a crankshaft 75, driven by a motor 76, that is connected through a connecting rod 77 to a lever 78. The lever 78, in turn, is pivotally connected through a pivot 79 to the work member 70 and on its lower end carries a mass 80 sandwiched between air springs 81 and 82. The air springs are held in place by brackets 83 and 84. In this arrangement, since the crankshaft 75 is carried on brackets 85 mounted on the base 73 there is no tendency for the V belts connecting the crankshaft to the motor to be subjected to vibratory motion. At the same time, the mass 80 on a lower end of the lever 78 may be, with low pressure in the air springs, tuned to resonance to eliminate the reaction force at this point and thus permit the connecting rod 77 to execute its full stroke without transmitting force to the work member 70. Increasing the inflation pressure of the air springs 81 and 82 provides an elastic resisting force for the lever 78 thus providing the force required to drive the work member 70 through its desired amplitude of vibration.

In the arrangements of FIGS. 7 and 8 the vibratory work member system must be tuned so that its resonant frequency is different from the operating speed. When this occurs there is enough residual spring force or inertia in the driven system to require a substantial force to maintain vibration at any given amplitude. Since the adjustable springs must work against this residual force the adjustment of the spring rate provides a full range of control of the amplitude of vibration.

These particular arrangements for controlling the amplitude of vibration provide exceptionally good regulation, i.e., little change in amplitude of vibration with variation in load, because of the relatively high mechanical impedance of the drive system. It may be shown theoretically that a vibratory system such as that shown in FIGS. 1, 7 or 8 corresponds to a vibratory system in which the crank throw is inversely proportional to the ratio of the rates of the adjustable springs and the residual spring effect of the tuned system and the spring rate of the equivalent coupling spring is the sum of the spring rates of the adjustable spring plus the effective spring rate of the vibratory system. Thus the drive appears to have a driving spring the rate of which is greater than the actual spring rate of the drive spring.

While it is desirable to be able to vary the spring rate of a coupling spring over a wide range in this type of control, a limited range of control may be achieved using a single air spring coupling the connecting rod to the work member. This system using a single air spring depends upon the spring rates of the conveyor resilient means to supply a resisting resilient force and also applies a load to the connecting rod bearings and crankshaft bearings corresponding to the static pressure in the air spring. Where this additional load on the bearings can be tolerated the single air spring may be used to advantage. In larger pieces of equipment however, it is preferable to use opposed air springs and thus relieve the connecting rod and crankshaft bearings of the static forces.

It may also be pointed out that since the air springs are in restricted communication with each other there is little restraint developed in the air springs opposing a settling of the conveyor deck or feeder trough with changes in load. Thus the air springs can accommodate themselves to whatever special positioning the conveyor attempts to take in response to load without transmitting corresponding large forces through the connecting rod.

Various modifications may be made in the details of construction of the various components of the system without losing the advantages of simple control of the amplitude of vibration provided by the improved system.

Having described the invention, I claim:

1. A method of controlling the amplitude of vibration of a vibratory apparatus that comprises a vibratory work member, a base member, resilient means connecting the members to form a vibratory system having a natural frequency, a crankshaft journaled in one of the members, and means including an adjustable rate spring means connecting the crankshaft to the other of the members that consists in operating the crankshaft at a speed at which the inertia force of the work member differs appreciably from the spring force of the resilient means and adjusting the spring rate of the adjustable spring to vary its deflection in overcoming the difference in said forces and thus the amplitude of vibration of the work member.

2. A method according to claim 1 in which the crankshaft is operated at a speed at which the spring force of the resilient means exceeds the inertia force of the work member.

3. A method according to claim 1 which comprises adjusting the air pressure in an air spring included in the spring means connecting the crankshaft to the other member.

4. In a vibratory apparatus, in combination, a vibratory work member, a base member, resilient means connecting the members to form a vibratory system, a crankshaft journaled on one of the members, means arranged to drive the crankshaft at a fixed speed, said vibratory system having a natural frequency that is near but different from the speed of the crankshaft, and means including a spring having an adjustable spring rate connecting the crankshaft to the other of said members, whereby said members are vibrated relative to each other at an adjustable fraction of the stroke of the crankshaft.

5. In a vibratory apparatus, in combination, a vibratory work member, a base, resilient means connecting the work member to the base to form a vibratory system having a resonant frequency, and a drive means having a substantially fixed operating speed that is near but different from said resonant frequency comprising a crankshaft, a connecting rod and a reaction mass for transmitting vibratory force to the work member, and adjustable rate springs connecting the reaction mass to said base forming a system tunable to and from said operating speed.

6. A vibratory system according to claim 5 in which the crankshaft is journaled on the work member.

References Cited by the Examiner

UNITED STATES PATENTS

| | | | |
|---|---|---|---|
| 1,720,574 | 7/1929 | Schieferstein | 74—26 |
| 1,722,767 | 7/1929 | Schieferstein | 74—26 |
| 1,757,392 | 5/1930 | Schieferstein | 74—26 |
| 3,019,889 | 2/1962 | Carrier | 198—220 |
| 3,180,158 | 4/1965 | Morris | 74—26 |

FRED C. MATTERN, Jr., *Primary Examiner.*

BROUGHTON G. DURHAM, *Examiner.*

F. E. BAKER, *Assistant Examiner.*